Mar. 3, 1925.

Re. 16,015

C. L. WHITE

ELECTRIC HEATER FOR MOVING TOOLS

Original Filed Jan. 24, 1921

INVENTOR.
Charles L. White
By his Attorney,
Nelson W. Howard

Reissued Mar. 3, 1925. Re. 16,015

UNITED STATES PATENT OFFICE.

CHARLES L. WHITE, OF MEDINA, NEW YORK, ASSIGNOR, BY MESNE ASSIGNMENTS, TO UNITED SHOE MACHINERY CORPORATION, OF PATERSON, NEW JERSEY, A CORPORATION OF NEW JERSEY.

ELECTRIC HEATER FOR MOVING TOOLS.

Original No. 1,454,875, dated May 15, 1923, Serial No. 439,416, filed January 24, 1921. Application for reissue filed May 14, 1924. Serial No. 713,369.

*To all whom it may concern:*

Be it known that I, CHARLES L. WHITE, a citizen of the United States, residing at Medina, in the county of Orleans and State of New York, have invented new and useful Improvements in Electric Heaters for Moving Tools, of which the following is a specification.

This invention relates to improvements in heating devices. The invention is illustratively set forth with particular reference to its application to the heating of rapidly moving tools such as edge setting or other shoe treating or finishing tools.

The heating of rapidly moving tools, such as are found in many forms of machines for use in connection with the manufacture of boots and shoes, has been largely accomplished by the application of an open gas flame applied directly to the tool. The use of a gas flame involves serious disadvantages, however, in that it frequently results in serious injury to the operator and also results in the overheating of the tool or the deposit of soot upon the tool by the gas flame with resulting discoloration of the work. It has been frequently proposed to substitute electric heating units for the gas flame. The use of electric units for the heating of the rapidly moving tools of machines such as edge setting machines and other shoe finishing and treating machines, has involved other difficulties. In the use of shoe finishing machines in general the operator must frequently remove the particular form of tool which may be in position in the machine and substitute therefor another form of tool better adapted for the piece of work which he wishes to present to the machine. If, then, the heating device is positioned closely adjacent to the tool which is to be removed, there is serious danger that the operator may burn his hands by contact with the heating unit. In some instances it has been proposed to mount an electric heating unit directly in the moving tool or its holder and to supply electricity to said unit by means of moving contacts in the case of a rotary tool or by means of flexible leads in the case of a vibrating tool. While some of these arrangements have been used with generally satisfactory results, their use has developed difficulty, not only in protecting the operator from injury, but also in always maintaining in good condition the electrical connections between the source of supply and the heating units in the tools. In other cases it has been found possible to supply heat to a rapidly moving tool by placing a relatively stationary heating unit in conducting relation thereto, but this arrangement, while possessing marked advantages, is still dangerous to the operator and sometimes develops deterioration of the unit itself because of the continuous vibration and jar to which it is subjected by reason of the vibration of the moving tool.

Accordingly, in view of the above-mentioned and other considerations, it is an object of this invention to provide means adapted for heating rapidly moving tools which, while retaining the advantageous characteristics of prior constructions such as those above-indicated, will be free from any tendency to deterioration of the electric conections or of the heating units and which will be otherwise economical and satisfactory. In the attainment of this object the present invention provides an improved electric heating unit mechanically separated from the tool so that the transfer of heat is largely by radiation and adjustably positioned at a greater or less distance from the rapidly moving tool in the machine to vary the temperature thereof.

One of the features of the invention consists in means for supporting and positioning the heating unit which are constructed and arranged to allow the unit to be moved away from the tool a substantial distance so that the tool may be changed without danger to the operator. Preferably, the arrangement is such that the heating unit is positioned at that side of the tool of the machine removed from the working position of the operator. Thus, when the heating unit is moved away from the tool to allow it to cool off and be removed, the heating unit is also still further removed from the operator's hands.

In the illustrative machine, in accordance with features of the invention, the tool is carried upon the free end of a driven shaft suitably supported in bearings in the machine and encircling this shaft intermediate between the tool and the main bearing are two collars, in one of which is mounted an electrically heated unit. These collars are connected by spacing members in such relation that there is opportunity for a substantial movement of the combined collars so as to move the heating unit toward and away from the tool. In accordance with other features of the invention, a novel organization is provided comprising a manually controlled member associated with one of said collars together with a fixed member associated with the main bearing of the machine so that the position of the heating unit and its supporting collars may be adjusted toward and away from effective heating proximity to the tool. This organization, including the detailed construction of the machine, will be hereinafter more fully described, set forth in the appended claims and illustrated in the accompanying drawings, in which—

Figure 1:
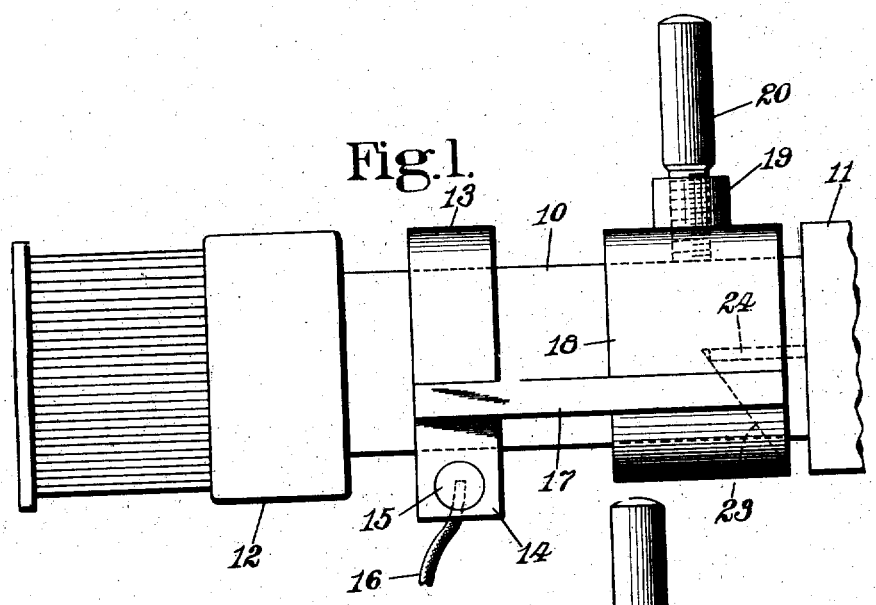
Figure 1 is an end portion of a driven shaft of a shoe machine showing the preferred embodiment of the invention associated with a rotary edge setting tool.
Figure 2:
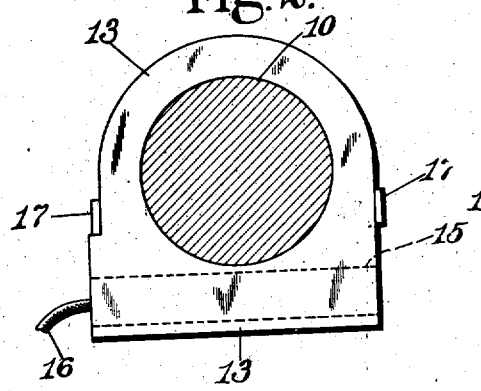
Fig. 2 is a transverse section through the driven shaft showing one end of the heating device in elevation.
Figure 3:
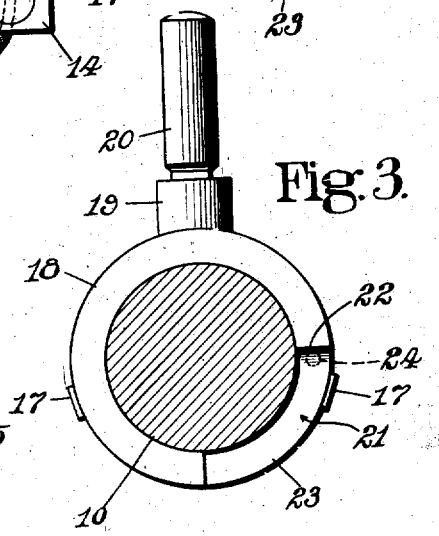
Fig. 3 is a view similar to Fig. 2 wherein is shown the opposite end of the device in elevation.

Referring to the drawing, in Fig. 1 thereof is shown the outer end portion of a driven shaft 10 which is supported in a bearing 11 and carries at its free end an edge setting tool 12, all of conventional form and arrangement. It will be understood that various forms of tools may be substituted for that shown without departing from the scope of the invention.

In the illustrated construction, the heating member is in the form of a collar 13 which is slidably mounted on the shaft 10 and restrained against rotation therewith. This heating member 13 is circular throughout the greater portion of its periphery and formed to provide a squared end portion 14 at one side, which portion 14 has a longitudinally extending bore into which is fitted an electrical heating coil 15, the latter being preferably removably held in the bore so as to be readily withdrawn for repair or replacement as desired or necessary, and the coil is connected to a suitable source of current supply (not shown) by the compound lead 16, extending rearwardly therefrom.

The heating member 13 is mechanically connected, by means of oppositely disposed metal strips or bars 17, to a slidable support 18, the strips or bars 17 being suitably soldered or welded to or cast with the opposite sides of the members 13 and 18 in a plane parallel to each other and to the shaft 10. These strips are of a length to hold the members spaced apart one from the other, whereby the support 18 is not subjected to any appreciable heating effect from the heating member 13. The support 18 is provided with a radially extending interiorly threaded nipple 19 in which is threaded an actuating handle 20.

The total length of the device is substantially less than the distance between the opposed faces of the bearing 11 and the tool 12, so that the heating collar 13 may be moved away from the tool a sufficient distance to allow sufficient room for the operator to remove the tool from the end of the shaft for the substitution thereon of another, or similar tool of the same size, or of a different size, without burning his hand in the operation.

For holding the device to prevent the rotation of the same with the shaft 10, the outer face of the supporting collar 18 is formed with an angular recess 21, one wall of which, as at 22, is disposed in the plane of the horizontal axis of the same, while the wall 23 is disposed at an angle thereto and is adapted to function as a cam surface, if desired, and into this recess is projected a pin 24, which is carried in the adjacent face of the bearing 11 and lies in a plane parallel to the shaft. This pin 24 is of a length to remain engaged in the recess 21 at all times, and if the collar 18 is given a quarter turn away from the operator in its movement to move the heating collar 13 toward the opposed face of the tool 12, the wall 23 of the recess 21 is engaged by the head of the pin 24 and the device is forced outward from the bearing 11 to move the heating collar 13 toward the tool 12. However, the device may be slid away from the bearing 11 without the quarter turn movement aforesaid, but in any case the same will be permanently held against complete rotation with the shaft. Variation of the position of the heater 13 with respect to the tool is effective, therefore, to regulate the heat supplied to the tool as conditions may require. When the heater and tool are brought into abutting relation, the transfer of heat will be largely by conduction but when it is separated from the tool, then the transfer of heat to the tool is partly by conduction and partly by radiation.

It is to be understood that various changes in the details of the construction and arrangement of the parts of the device may be resorted to and that the heater may be used with tools of various sorts without departing from the spirit and scope of the invention.

Having thus described my invention, what I claim as new and desire to secure by Letters Patent of the United States is:—

1. In a machine of the class described, a driven shaft, a tool carried on said shaft, and a heating means mounted for movement to and from effective heating proximity to said tool.

2. In a machine of the class described, a driven shaft, a tool carried at the free end of said shaft, a heating means carried on said shaft for heating said tool, and means for moving said heating means to and from effective heating proximity to said tool.

3. In a machine of the class described, a driven shaft, a tool carried at the free end of said shaft, and a heating means movable on said shaft to and from effective heating proximity to said tool.

4. In a machine of the class described, a driven shaft, a tool carried at the free end of said shaft, and a non-rotatable electrically heated means movable on said shaft to and from effective heating proximity with respect to said tool.

5. In a machine of the class described, a driven shaft, a tool carried on said shaft, a non-rotatable electrically heated means carried on said shaft, and means for moving said heated means to and from effective heating proximity to said tool.

6. In a machine of the class described, a driven shaft, a tool carried at the free end of said shaft, and an electrically heated means movable on said shaft and associated with said tool.

7. In a machine of the class described, a driven shaft, a tool carried at the free end of said shaft, an electrically heated means movable on said shaft for heating said tool, and means for moving said heating means into and out of the contact with said tool.

8. In a machine of the class described, a driven shaft, a tool carried at the free end of said shaft, an electrically heated means movable on said shaft, and manually operated means for moving said heating means into and out of contact with said tool.

9. In a machine of the class described, a driven shaft, a tool carried at the free end of said shaft, a member movable on said shaft, an electrically heated means carried by said member, and means for moving said member into and out of contact with said tool.

10. In a machine of the class described, a driven shaft, a tool carried at the free end of said shaft, a collar encircling said shaft, an electrically heated coil carried by said collar, and means for moving said collar into and out of contact with said tool.

11. In a machine of the class described, a driven shaft, a tool carried at the free end of said shaft, a collar encircling said shaft, an electrically heated coil carried by said collar, a bearing collar spaced from and connecting the first named collar, and an operating handle carried by said bearing collar for moving the first named collar into and out of contact with said tool.

12. In a machine of the class described, a main bearing, a driven shaft journalled in said main bearing and having a free end projecting therefrom, a tool carried at the free end of said shaft, a heating collar, an electrically heated coil carried by said heating collar, a bearing collar slidably mounted on said shaft with said heating collar and connecting the latter in spaced relation between the opposed faces of said main bearing and said tool, and means for moving said collars along said shaft whereby to adjust the heating collar with respect to said tool.

13. In a machine of the class described, a main bearing, a driven shaft journalled in said main bearing and having a free end projecting therefrom, a tool carried at the free end of said shaft, a heating collar, an electrically heated coil carried by said heating collar, a bearing collar slidably mounted on said shaft with said heating collar and connecting the latter in spaced relation between the opposed faces of said main bearing and said tool, means for moving said collars along said shaft whereby to adjust the heating collar with respect to the tool, and means carried by said main bearing and associated with said bearing sleeve whereby to prevent the rotation of both of said collars with said shaft.

14. In a machine of the class described, a driven shaft, a tool carried on said shaft, a heating means carried on said shaft for heating said tool, and means for moving said heating means into and out of contact with said tool.

15. In a machine of the class described, a driven shaft, a tool carried on shaft, an electrically heated means carried on said shaft for heating said tool, and means for moving said heating means to and from effective heating proximity to said tool.

16. In a machine of the class described, a driven shaft, a tool carried on said shaft, non-rotatable electrically heated means movably mounted on said shaft, and manually operated means for moving said heated means to and from heating proximity to said tool.

17. In a machine of the class described, a driven shaft, tool carried on said shaft, a member movable with respect to said tool, a heating means carried by said member, and means for moving said member to and from effective heating proximity to said tool.

18. In a machine of the class described, a driven shaft, a tool carried on said shaft, a member movable with respect to said tool, an electrically heated means carried by said member, and means for moving said member to and from effective heating proximity to said tool.

19. In a machine of the class described, a driven shaft, a tool carried on said shaft, a heating means for said tool, and a manually operated cam means for moving said heating means to and from effective heating proximity to said tool.

20. In a machine of the class described, a driven shaft, a tool carried on said shaft, an electrically heated means for said tool, and a manually operated cam means for moving said heating means to and from effective heating proximity to said tool.

21. In a machine of the class described, a driven shaft, a tool carried on said shaft, a member movable on said shaft, a heating means carried by said member, and a cam means for moving said member to and from effective heating proximity to said tool.

22. In a machine of the class described, a driven shaft, a tool carried on said shaft, a member movable on said shaft, an electrically heated means carried by said member, and a cam means for moving said member to and from effective heating proximity to said tool.

23. In a machine of the class described, a driven shaft, a tool carried on said shaft, a member movable on said shaft, a removable heating means carried by said member, and a cam means for moving said member to and from effective heating proximity to said tool.

24. In a machine of the class described, a driven shaft, a tool carried on said shaft, a member movable on said shaft, a removable electrically heated means carried by said member, and a cam means for moving said member to and from effective heating proximity to said tool.

25. In a machine of the class described, a driven shaft, a tool carried on said shaft, a member movable on said shaft, a heating means carried by said member, means for preventing the rotation of said member with said shaft, and means for moving said member into and out of contact with said tool.

26. In a machine of the class described, a driven shaft, a tool carried on said shaft, a member movable on said shaft, an electrically heated means carried by said member, and means for moving said member into and out of contact with said tool, said means also acting to prevent the rotation of said member with said shaft at all times.

27. In a machine of the class described, a driven shaft, a tool carried on said shaft, a collar movable on said shaft, a heating means carried by said collar, a cam recess formed at one end of said collar, a stationary pin engaged in said recess, and means for effecting a turning movement to said collar, whereby said pin acts on the cam wall of said recess to move said collar into contact with said tool.

28. In a machine of the class described, a driven shaft, a tool carried on said shaft, a collar movable on said shaft, an electrically heated means carried by said collar, a cam recess formed at one end of said collar, a stationary pin engaged in said recess, and means for effecting the turning movement to said collar whereby said pin acts on the cam wall of said recess to move said collar into contact with said tool, said pin remaining in engagement with said recess at all times whereby to prevent the rotation of said collar with said shaft.

29. A machine of the class described having, in combination, a finishing tool, means for actuating the tool, and means for heating the tool by radiation comprising a heating unit mounted adjacent to the path of the tool, and means for causing relative movement between the unit and the tool to control the amount of heat which radiates to the tool.

30. A machine of the class described having, in combination, a moving finishing tool, means for actuating the tool, and means for heating the tool by radiation comprising heating means mounted adjacent to the path of the tool, and means for causing relative movement between said heating means and the tool other than the actuating movement of the tool to control the amount of heat which radiates to the tool.

31. In a machine of the class described, a moving tool, heating means having an operative position adjacent to the path of movement of said tool whereby the tool is heated, and means for moving said heating means to inoperative position removed from said tool to stop the heating action and to allow manipulation or removal of said tool without danger of contact with the heating means.

32. In a machine of the class described, a main bearing, a driven shaft supported in said main bearing and having a free end projecting therefrom, a tool carried at the free end of said shaft, a heating unit arranged to transmit heat to said tool, and means for supporting said unit for movement along said shaft, constructed and arranged to be substantially shorter than the distance between the main bearing and the tool, whereby considerable range of movement is allowed for the heating unit toward and away from the tool.

In testimony whereof I have signed my name to this specification.

CHARLES L. WHITE.